June 3, 1952  J. R. LEMON  2,599,336
FLUID POWER TRANSMITTING DEVICE
Filed June 6, 1945  3 Sheets-Sheet 1
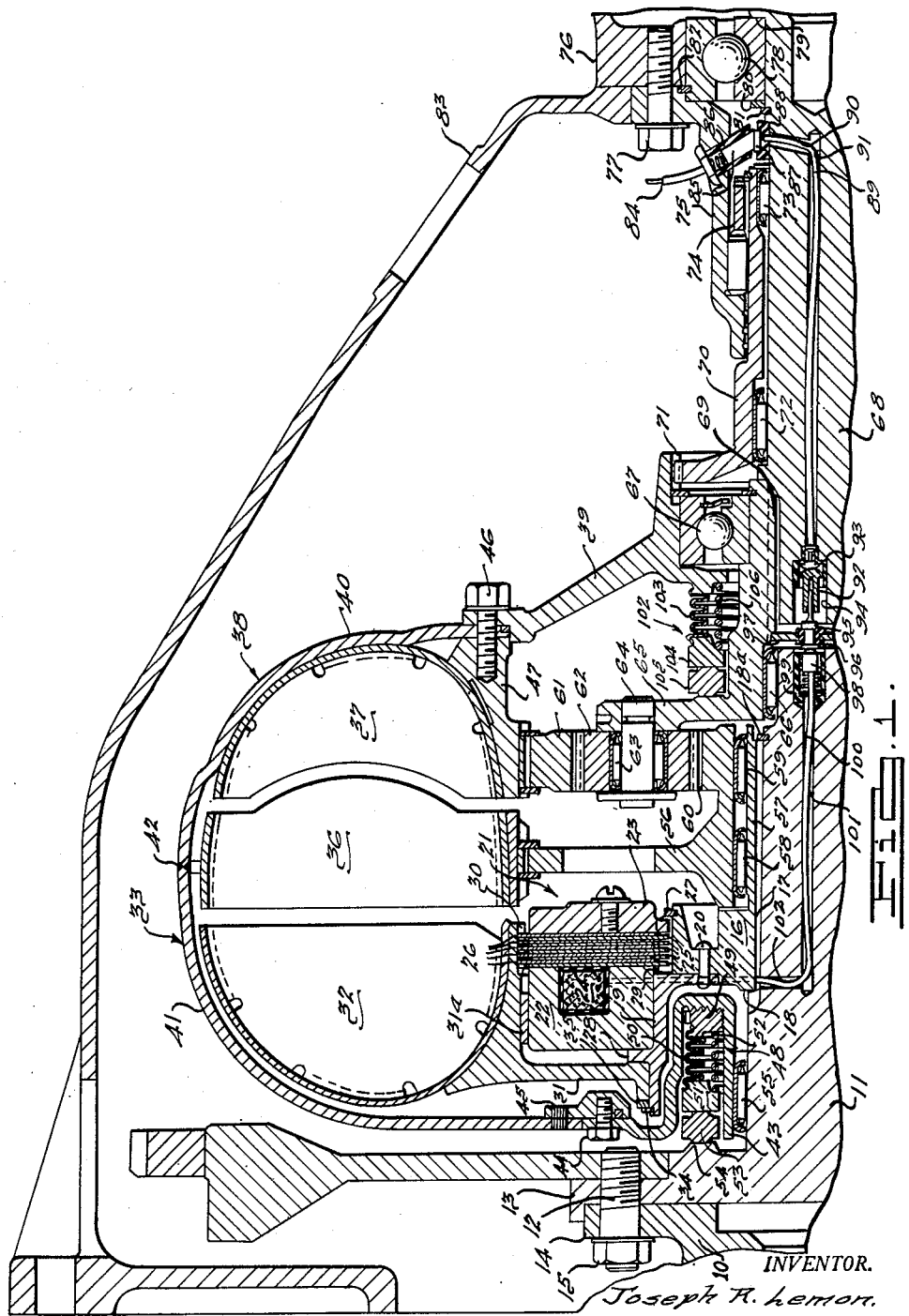
INVENTOR.
Joseph R. Lemon.
BY
Harness and Harris
ATTORNEYS.

June 3, 1952  J. R. LEMON  2,599,336
FLUID POWER TRANSMITTING DEVICE
Filed June 6, 1945  3 Sheets-Sheet 2
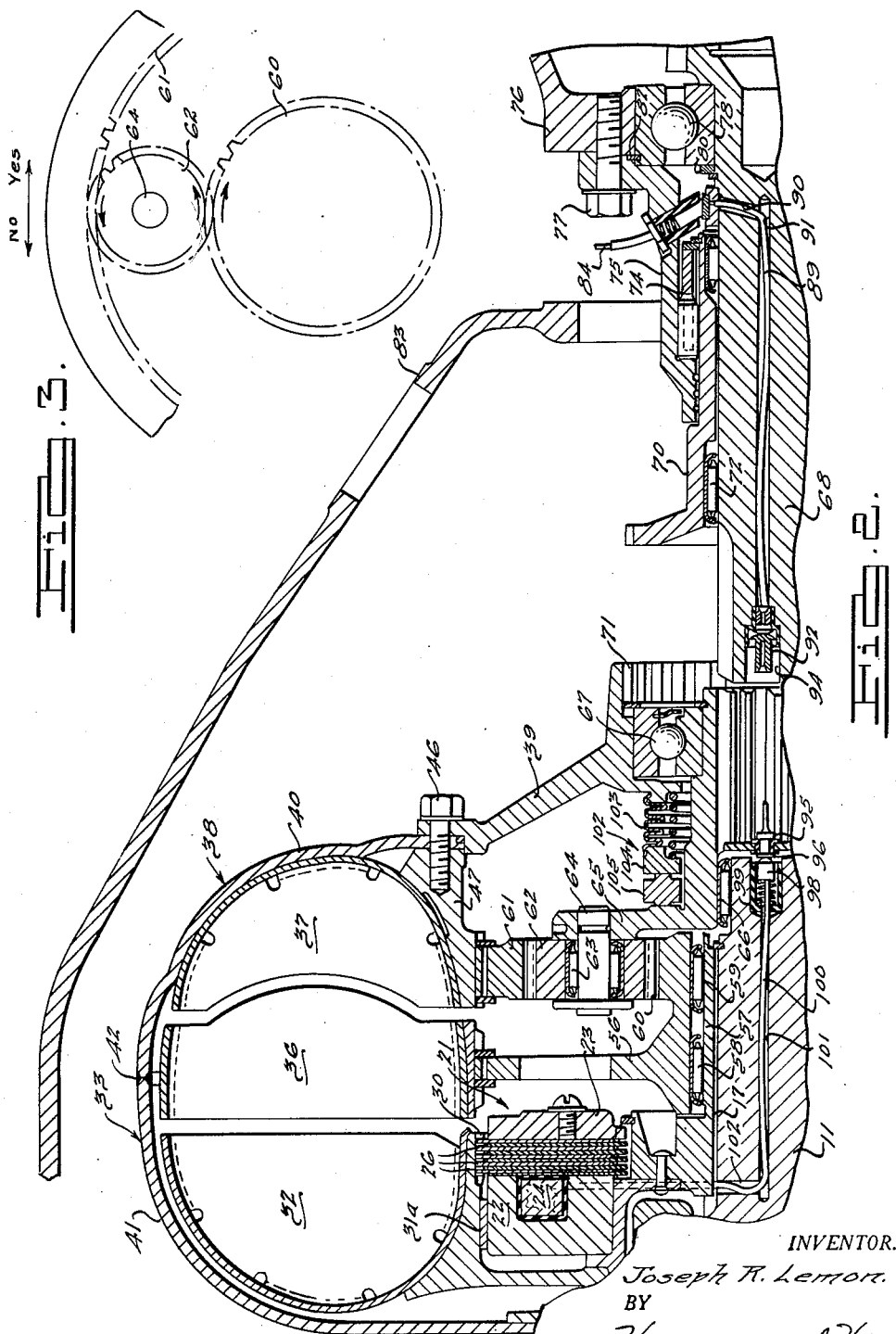

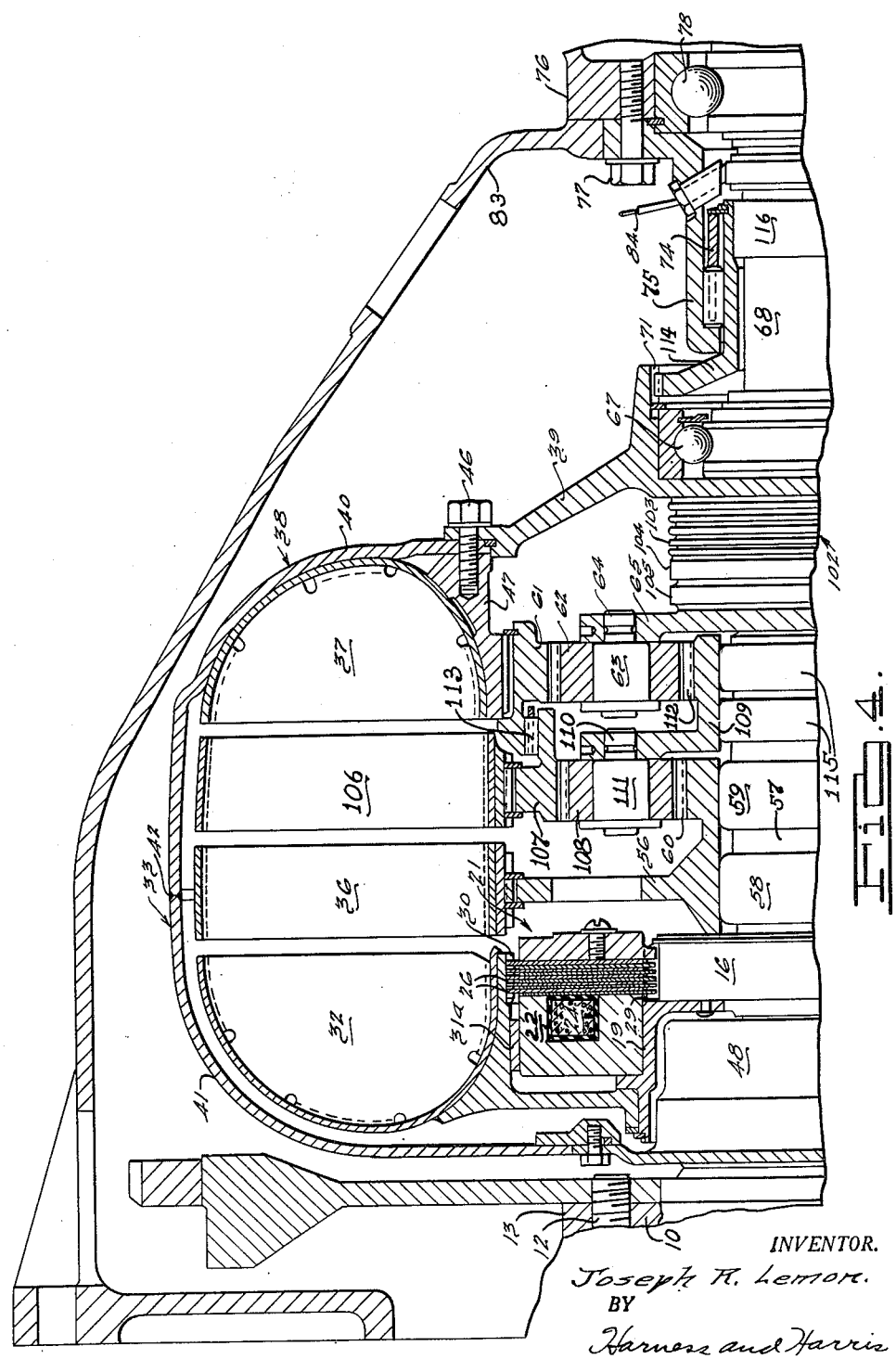

Patented June 3, 1952

2,599,336

UNITED STATES PATENT OFFICE 2,599,336

FLUID POWER TRANSMITTING DEVICE

Joseph R. Lemon, Detroit, Mich., assignor to Chrysler Corporation, Highland Park, Mich., a corporation of Delaware Application June 6, 1945, Serial No. 597,745

29 Claims. (Cl. 74—677)

This invention relates to a fluid power-transmitting device. More specifically it relates to a multi-stage fluid coupling.

It is known to provide a multi-stage fluid coupling in which the various stages drive at various reduction ratios so as to provide different rates of torque multiplication. The drawback in such a construction has been that the load of driving is assumed by only one stage at a certain time. It is also known to provide an hydraulic torque converter for securing different rates of torque conversion and to employ certain forms of epicyclic trains with the torque converter for obtaining a final condition in which the load is shared between the driven parts of the torque converter. The drawback of a torque converter is that the shaping of the blades is very expensive. I have adapted an epicyclic train to the various driven members of a multi-stage coupling for causing them to share the load. The epicyclic train is of a special form that is not limited in its use to a fluid coupling and so may be applied to a torque converter.

An object of the present invention is to provide an improved fluid power-transmitting device. More particularly this may involve the provision of a connecting system between a plurality of driven members of the device and an output member for causing the driven members to share the load imposed by the output member.

A further object is to provide improvements in a fluid power-transmitting device involving a plurality of driven members arranged so that fluid is received by a certain driven member spaced from a driving member only by way of another driven member and is returned to the driving member only by way of said other driven member. More specifically this will involve the use of an epicyclic train for causing the various driven members to share the load of an output member.

Another object is to provide an improved arrangement of a fluid power-transmitting device and an epicyclic train.

Still another object is to provide improvements in means for supplying current to a magnetic clutch employed for connecting an input shaft with a fluid power-transmitting device.

Other objects will appear from the disclosure.

In the drawing:

Fig. 1 is a sectional view through an assembly of parts including a fluid power-transmitting device;

Fig. 2 is a sectional view through the assembly of parts of Fig. 1 in partially disassembled position; and Fig. 3 is a schematic view of parts of the assembly of Fig. 1; and Fig. 4 is a sectional view showing a modified assembly of parts.

The reference character 10 designates an input or driving shaft, which may be connected to an internal combustion engine, not shown. The shaft 10 has a terminal portion 11 secured thereto by bolts 12 threaded into a flange 13 on the terminal portion 11 and extending through a flange 14 on the shaft 10 proper, and nuts 15 on the bolts. A sleeve 16 is splined upon the terminal portion 11 as indicated at 17 and abuts a shoulder 18 formed upon the terminal portion 11. The sleeve 16 is retained on the terminal portion 11 by a ring 18ª set in a groove in the terminal portion. A ring 19, which is formed of some non-magnetic material such as brass, is secured to the sleeve 16 by rivets 20. The sleeve and ring support a magnetic clutch 21, comprising a magnetic part 22, a magnetic part 23, a coil 24 resting in a groove in the magnetic part 22, a set of clutch discs 25, and a set of clutch discs 26 alternately placed with respect to the clutch discs 25. The magnetic part 23 is kept on the sleeve 16 by a retaining ring 27 set in a groove in the sleeve 16. The magnetic part 22 abuts a flange 28 on the ring 19. The set of clutch plates 25 is splined to the sleeve 16 as indicated at 29. The set of clutch plates 26 is splined as indicated at 30 to a hub 31 attached to a driving member 32 of a fluid coupling 33. The magnetic part 22 is pressed or shrunk on the ring 19, and turns in a non-magnetic ring 31ª formed, for example, of brass, pressed into the hub 31. The hub 31 is mounted upon the ring 19 and is retained against the flange 28 formed thereon by a ring 34 fixed to the ring 19, the ring 34 contacting a ring 35 in turn contacting the hub 31. The fluid coupling 33 includes not only the driving member 32 but also driven members 36 and 37 and a casing 38 secured to the driven member 37. The casing 38 comprises a hub part 39, shell halves 40 and 41 welded to one another as indicated at 42, and a channel 43 secured to the shell half 41 by means of screws 44 threaded into a ring 45 welded to the shell half 41. The driven member 37 is welded or soldered to the shell half 40. The hub part 39 is secured to the shell half 40 by means of screws 46 passing through the shell half 40 and the hub part 39 and threaded into a reinforcing part 47 secured by soldering or welding to the driven member 37. It will be observed that the portion of the sleeve 16 to which the ring 19 is attached by the rivets 20 is narrower than the magnetic clutch 21, and because the sleeve 16 is narrower at this portion, there is left a space within the ring 19 alongside the sleeve 16. In this space the channel 43 is positioned. Within the channel is positioned a seal 48, which includes a ring 49 threaded into the channel, an expansible-collapsible element 50, a ring 51, a coil spring 52, and a ring 53. The expansible-collapsible element 50 is bonded to the rings 49 and 51 so as to provide a seal between them. The coil spring 52 acts between the rings 49 and 51 to urge ring 51 against the ring 53 and the ring 53 against a projection 54 formed on the flange 13 of the terminal portion 11 of the input shaft 10. Thus the seal 48 establishes a seal between the left end of the casing 38 and the shaft 10. A needle bearing 55 is positioned between the channel 43 and the terminal portion 11 of the input shaft 10 so as to provide a mounting for the casing 38 upon the shaft 10.

Attached to the driven member 36 is a hub 56 journalled upon a thin portion 57 of the sleeve 16 by means of two needle bearings 58 and 59. The hub 56 has an extension formed as an external gear 60. An internal gear 61 is secured to the reinforcing ring 47. One or more planet gears 62, only one being shown, meshes with the external and internal gears 60 and 61 and is journalled by means of a needle bearing 63 upon a pin 64 secured to a carrier 65. The carrier 65 is journalled upon the terminal portion 11 of the input shaft 10 by means of a needle bearing 66 and in the hub part 39 of the casing 38 by means of a ball bearing 67. The carrier 65 is splined to an output shaft 68 as indicated at 69. A tubular extension 70 has a splined connection 71 with the hub part 39 of the casing 38 and may be considered to form a part of the casing. The tubular extension is journalled upon the output shaft 68 by means of spaced needle bearings 72 and 73. A one-way brake 74 acts between the tubular extension 70 and a sleeve 75 surrounding the tubular extension. The sleeve 75 is secured to a member 76 by means of screws 77. The output shaft 68 is journalled in the member 76 by means of a ball bearing 78, which is retained in position on the output shaft 68 by a shoulder 79 formed thereon, and rings 80 and 81, the ring 81 being positioned in a groove in the output shaft 68. The ball bearing 78 is retained in position in the member 76 by means of a ring 82 clamped between the sleeve 75 and the member 76 and inserted in a recess in the exterior of the ball bearing 78. The sleeve 75 and member 76 are attached by means not shown, to a fixed housing 83, and by virtue of such attachment are fixed.

An insulated conductor 84 is connected to a spring-urged plunger 85 mounted in the sleeve 75 by means of an insulating bushing 86. The plunger 85 is urged into engagement with a conducting ring 87 mounted in an insulating ring 88 on the output shaft 68. An insulated conductor 89 is connected at one end to the conducting ring 87 and extends through a cross bore 90 and an axial bore 91 in the output shaft 68. The conductor 89 is connected to a socket 92 mounted in an insulating member 93 positioned in an enlarged bore 94 formed in the output shaft 68 at the end of the axial bore 91. A plug 95 engages the socket 92 and is mounted by means of an insulating bushing 96 in a member 97 secured to the carrier 65. The plug 95 is engaged by a spring-urged plunger 98 mounted in an insulating bushing 99 in the end of the terminal portion 11 of the output shaft 10. An insulating conductor 100 is connected with the plunger 98 and extends through an axial bore 101 and a cross bore 102 in the terminal portion 11 of the input shaft 10 and then to the ring 16 and the magnetic part 22 to the coil 24. Current is supplied to the magnetic coil 24 by the various parts just described. Return of the current is supplied through a connection to ground, not shown.

A seal 102 acts between the hub part 39 of the casing 38 and the carrier 65. This seal includes an expansible-collapsible element 103, a ring 104, a ring 105, and a coil spring 106. The element 103 is secured to the hub part 39 and to the ring 104 to provide a seal between them. The coil spring 106 urges the ring 104 against the ring 105 and the ring 105 against the carrier 65.

As previously stated, the external gear 60 is formed on the hub 56 attached to the driven part 36 of the fluid coupling 33 and the internal gear 61 is attached to the reinforcing ring 47 attached to the driven part 37. Thus these gears are respectively attached to the driven parts 36 and 37. These driven parts are arranged to rotate about the aligned axes of the input shaft 10 and the output shaft 68 and the gears 60 and 61 are formed concentric with these aligned axes. Thus they are gears with fixed axes of rotation. Since the carrier 65 is splined to the output shaft 68, the carrier rotates about the aligned axes of the input and output shafts and the pin 64 upon which the planet gear 62 is mounted, also rotates about these aligned axes. Since the pin 64 constitutes the axes of the planet gear 62, this gear has a revolving axes of rotation. Fig. 3 shows diagrammatically the arrangement of the gears 60, 61, and 62. Consider now that the magnetic clutch 24 is engaged so as to provide drive between the sleeve 16 and the driving member 32 of the fluid coupling 33 and that the input shaft 10 rotates in a clockwise direction when viewed in a direction looking from the left to the right of Fig. 1. The driving member 32 moves in a clockwise direction and by means of the fluid within the coupling 33 causes the driven member 36 also to move in a clockwise direction. This produces a clockwise movement of the external gear 60 in a clockwise direction as indicated by the arrow applied to this gear in Fig. 3. As seen, clockwise movement of the gear 60 tends to produce a counterclockwise rotation of the gear 61. However, such counterclockwise rotation of the gear 61 cannot take place because the internal gear 61 is held against counterclockwise rotation by means of the one-way brake 74 acting between the fixed sleeve 75 and the tubular extension 70 of the casing 38. Accordingly, the planet gear 62 is forced to roll in a clockwise direction within the gear 61. As shown, the external gear 60 has a diameter twice as large as that of the planet gear 62 and thus the rotational speed of the pin 64 upon which the planet gear 62 is mounted or of the carrier 65 is one-third of the rotational speed of the gear 60. This means that the rotational speed of the output shaft 68 is one-third of that of the driven member 36 of the fluid coupling 33. Accordingly, the torque exerted upon the output shaft 68 is three times as great as that exerted by the driven member 36. This condition continues until sufficient fluid and great enough force reaches the driven member 37 attached to the internal gear 61, setting up a sufficient clockwise force upon the driven member 37 to overcome the counterclockwise force exerted thereon through the planet gear 62 against the gear 61. When the clockwise force upon the driven member 37 exceeds the counterclockwise force, the member 37 commences to move in a clockwise direction, thus increasing the rotational speed of the pin 64 and the carrier 65. When the driven members 36 and 37 move at the same speed speed the gears 60 and 61 will, of course, move at the same speed, locking the planet gear 62 between them and moving the pin 64 and the carrier 65 at the same speed; thus a 1:1 speed ratio is obtained. The internal gear 61 and the driven member 37 start their clockwise movement when the torque assumed by the driven member 37 is just greater than two-thirds of the total torque or is just greater than twice the torque assumed by the driven member 36. This must be the case for the radius of the internal gear 61 is twice that of the external gear 60.

It has been stated that the torque exerted upon the output shaft is three times as great as that exerted by and upon the first driven member 36. This torque ratio continues until the second driven member 37 starts to move, whereupon it decreases gradually to 1:1 in the same way that the speed ratio increases to 1:1. Now consider another torque ratio, namely, overall torque ratio or the ratio of the torque exerted by the driving member 32 to that exerted upon the output shaft. This torque ratio is 3:1 at the outset and immediately starts to decrease as the fluid begins to reach the driven member 37. This torque ratio decreases to 1:1, whereupon the driven member 37 commences to rotate. At this point the driven member 37 receives two-thirds of the torque exerted by the driving member 32, and the driven member 36, one-third.

The speed ratio commences to increase from 1:3 to 1:1 only when the driven member 37 starts to rotate. The decrease in overall torque ratio to 1:1 is completed at the time the driven member 37 starts to rotate. Thus there are two distinct phases; fadeout in overall torque ratio and increase in speed ratio.

It has been stated that the external gear 60 has a diameter twice as large as that of the planet gear 61, and that thus the rotational speed of the pin 64 carrying planet gear 61 is one-third of the rotational speed of the gear 60, with the result that until the second driven member 37 starts to rotate, the speed ratio of the first driven member 36 and the output shaft 68 is 3:1. It is to be understood that the parts may be differently proportioned if desired to effect a different ratio.

Fig. 2 shows the parts in disassembled position. For this sleeve 75 and the member 76 are detached from the fixed housing 83; then the sleeve 75, the member 76, the tubular extension 70, and the output shaft 68, are moved to right as a unit, the splined connections of the tubular extension 70 with the hub part 39 and of the output shaft 68 with the carrier 65 permitting such disconnection. At the same time the socket 92 forming part of the electrical connection to the magnetic clutch 21 is disconnected from the plug 95.

It will be seen that the gears 60, 61 and 62 and the carrier 65 constitute an epicylic train connecting the driven members 36 and 37 of the fluid coupling with the output shaft in such a way as to provide a speed reduction and a torque multiplication at the start of operation and finally a division of the load of the output shaft between the driven members at the instant when the driven member 37 starts to rotate and thereafter, or in other words, when both driven members are rotating.

Fig. 4 shows a modified form of apparatus in which there are three driven members instead of two. The shaft 10 drives the sleeve 16 mounted on the terminal portion 11 of the shaft 10, the sleeve 16 driving the driving member 32 through the magnetic clutch 21. The first driven member 36 is secured to a hub 56, on which is formed the external or sun gear 60. The final driven member 37 is secured to the casing part 40 and to the reinforcing part 47, to which is secured the internal or ring gear 61. The internal gear 61 meshes with one or more planet gears 62 mounted on carrier 65 splined to output shaft 68.

However, the driven parts 36 and 37 are not immediately adjacent one another but are spaced from one another by a further driven member 106. To this member is secured an internal gear 107 meshing with one or more planet gears 108, which mesh with external gear 60 and are mounted on a carrier 109 by pins 110 and needle bearings 111. Formed on the carrier 109 is an external or sun gear 112 meshing with the planet gears 62. A one-way clutch 113 acts between the internal gears 61 and 107.

In operation of the device of Fig. 4 the driving member 32 rotates, for example, in a clockwise direction upon engagement of magnetic clutch 21. Fluid impelled by the driving member 32 against the first driven member 36 causes it to rotate clockwise. The driven member 36 acting through the external gear 60 and the planet gears 108 tends to effect counterclockwise direction. However, such rotation is prevented by the one-way clutch 113 and one-way brake 74 acting together between the sleeve portion of the fixed housing 83 and the internal gear 107. Thus the planet gears 108 rotate and cause clockwise rotation of the carrier 109 and the external gear 112. The ratio of speed of the gear 112 to that of the gear 60 is 1:3 because of the proportions of the parts involved. It is to be understood that the parts might be differently proportioned so as to produce another desired speed ratio. The external gear 112 acts through the planets 62 to tend to rotate the gear 61 in a counterclockwise direction, but this is prevented by the one-way brake 74. The ratio of speed of the carrier 65 or the output shaft 68 to that of the gear 112 is 1:3, and so the overall speed ratio of first driven member 36 to the output shaft 68 is 1:9. Here again the parts may be differently proportioned to obtain a different speed ratio. The torque multiplication ratio is 9:1. As the amount of fluid reaching the driven member 106 is increased, the torque ratio between the carrier 109 and the driving member 32 is decreased from 3:1 to 1:1, and shortly thereafter the driven member 106 commences to rotate in a clockwise direction. The overall toque ratio has been decreased from 9:1 to 3:1. After the driven member 106 and the internal gear 107 start to rotate, the speed ratio of the carrier 109 and external gear 112 commences to increase from 1:3 to 1:1, and so the overall speed ratio begins to increase from 1:9 to 1:3. In the meantime fluid will have been reaching the driven member 37 and the torque ratio between the carrier 109 and the output shaft 68 will have been decreasing from 3:1 to 1:1. There will be some overlapping between the two torque fadeouts, but of course the torque ratio between the carrier 109 and the gear 60 will reach 1:1 before the torque ratio between the carrier 65 and the carrier 109 reaches 1:1. When both torque ratios reach 1:1, the overall torque ratio becomes 1:1. There may be some overlapping between the increases in the speed ratios, for the gear 107 may not necessarily be brought to the speed of the gear 60 before the gear 61 starts to rotate.

The magnetic clutch 21 of Fig. 4 is actuated in the manner of the clutch 21 of Fig. 1, i. e., by current supplied through conductor 84. Tubular extension 114 of the casing is keyed to the hub part 39 as indicated at 71 and is readily disconnected therefrom by axial movement after the sleeve 75 and the member are detached from the fixed housing 83. The output shaft 68 is moved away from the terminal portion of the input shaft and the electrical parts between the magnetic clutch 21 and the conductor are disconnected in the manner of Figs. 1 and 2.

The hub 56 is journalled upon thin portion 57 of sleeve 16 by means of needle bearings 58 and 59. Needle bearings 115 journal the carrier 109 on the thin portion 57. The terminal portion of the input shaft 10 has a reduced extremity journalled in the carrier 65 in the manner of the corresponding parts of Fig. 1. The tubular extension 114 is journalled on the output shaft 68 by means of a needle bearing 116.

It will be seen that the gears 60, 108, 107, 112, 62 and 61 and the carriers 109 and 65 constitute an epicyclic train connecting the driven members 36, 106, and 37 of the fluid coupling with the output shaft 68 in such a way as to provide a speed reduction and a torque multiplication at the start of operation and finally a division of the load of the output shaft between the driven members as soon as the driven members 106 and 37 start to rotate. When driven member 106 starts to rotate, there is a division in load between driven members 36 and 106. When driven member 37 starts to rotate, there is a division in load between all three driven members 36, 106, and 37.

I claim:

1. In combination, a driving shaft, a driven shaft, a fluid power transmitting device comprising a driving member, a first driven member surrounding the driving shaft, a second driven member spaced from the driving member, and a casing surrounding the members and secured to the second driven member, the said members conjointly defining a liquid working chamber and said members each having fixed radial vanes extending the depth of the chamber, a magnetic clutch for drivingly connecting the driving shaft and the driving member of the fluid coupling, a sun gear drivingly connected to the first driven member, an internal ring gear connected to the second driven member, planet gears meshing with the sun gear and the ring gear, a carrier for the planet gears drivingly connected with the driven shaft and journalled on the driving shaft, a fixed means, and a one-way brake connecting the second driven member and the fixed means.

2. In an assembly comprising an input shaft, an output shaft, and a fluid power transmitting device comprising a driving member drivingly connected to the input shaft, a first driven member surrounding the input shaft, and a second driven member, the said members conjointly defining a liquid working chamber and said members each having fixed radial vanes extending the depth of the chamber, the combination therewith of a sun gear drivingly connected to the first driven member, an internal ring gear drivingly connected to the second driven member, planet gears meshing with the ring gear and the sun gear, a carrier for the planets drivingly connected to the output shaft and journalled on the input shaft, a fixed means, and a one-way brake acting between the fixed means and the ring gear.

3. In combination, an input shaft, an output shaft, a fluid coupling comprising a driving member drivingly connected to the input shaft, a first driven member adjacent the driving member, a second driven member adjacent the second driven member and spaced from the driving member, and a casing surrounding the members and secured to the second driven member, the said members conjointly defining a liquid working chamber and said members each having fixed radial vanes extending the depth of the chamber, an internal ring gear drivingly connected to and positioned within the second driven member, a sun gear drivingly connected to the first driven member and positioned within the ring gear, planet gears meshing with the ring gear and the sun gear, the sun, ring, and planet gears being entirely within the casing, a carrier for the planet gears drivingly connected to the output shaft and journalled on the input shaft, a fixed means, and a one-way brake acting between the fixed means and the casing to prevent rotation of the ring gear in one direction.

4. An assembly comprising an input shaft, an output shaft, and a fluid power-transmitting device comprising a driving member drivingly connected with the input shaft and a plurality of driven members, the said members conjointly defining a liquid working chamber and said members each having fixed radial vanes extending the depth of the chamber, one driven member having the driving member at one side and receiving fluid therefrom, another driven member being at the other side of the said one driven member and spaced from the driving member so as to receive fluid from the driving member only after passage of the fluid through the said one driven member and to return the fluid to the driving member only by way of the said one driven member, first and second gears having fixed axes of rotation, a third gear meshing with the first and second gears, a carrier for the third gear providing the same with a revolvable axis of rotation, means drivingly connecting the said one driven member with one element of the group composed of the first and second gears and the carrier, means drivingly connecting the said other driven member with another element of the aforesaid group, and means drivingly connecting the output shaft with the third element of the aforesaid group said means being journalled on the said input shaft.

5. An assembly comprising an input shaft, an output shaft, a fluid power-transmitting device comprising a driving member drivingly connected with the input shaft and a plurality of driven members, the said members conjointly defining a liquid working chamber and said members each having fixed radial vanes extending the depth of the chamber, one driven member having the driving member at one side and receiving fluid therefrom, another driven member being at the other side of the said one driven member and spaced from the driving member so as to receive fluid from the driving member only after passage of the fluid through the said one driven member and to return fluid to the driving member only by way of the said one driven member, first and second gears having fixed axes of rotation, a third gear meshing with the first and second gears, a carrier for the third gear providing the same with a revolvable axis of rotation, means drivingly connecting the carrier with the output shaft said means being telescopically positioned relative to said input and output shafts, means drivingly connecting one of the first and second gears with the said one driven member, means drivingly connecting the other of the first and second gears with the said other driven member, and a one-way brake preventing rotation in one direction of one of the aforementioned driven members.

6. An assembly comprising an input shaft, an output shaft, a fluid power-transmitting device comprising a driving member drivingly connected with the input shaft and a plurality of driven members, the said members conjointly defining a liquid working chamber and said members each having fixed radial vanes extending the depth of the chamber, one driven member having the driving member at one side and receiving fluid therefrom, another driven member being at the other side of the said one driven member and spaced from the driving member so as to receive fluid from the driving member only after passage of the fluid through the said one driven member and to return fluid to the driving member only by way of the said one driven member, a first gear having external teeth and a fixed axis of rotation, a second gear having internal teeth and a fixed axis of rotation, a third gear meshing with the first and second gears, a carrier for the third gear providing the same with a revolvable axis of rotation, means drivingly connecting the first gear with the said one driven member, means drivingly connecting the second gear with the said other driven member, means drivingly connecting the carrier with the output shaft and being journalled on the input shaft, and a one-way brake preventing rotation of the said other driven member in one direction said one-way brake surrounding the output shaft.

7. An assembly comprising an input shaft, an output shaft, a fluid power-transmitting device comprising a driving member drivingly connected with the input shaft and a plurality of driven members, the said members conjointly defining a liquid working chamber and said members each having fixed radial vanes extending the depth of the chamber, one driven member having the driving member at one side and receiving fluid therefrom, another driven member being at the other side of the said one driven member and spaced from the driving member so as to receive fluid from the driving member only after passage of the fluid through the said one driven member and to return fluid to the driving member only by way of the said one driven member, means interconnecting the output shaft and the said one and said other driven members in an epicyclic train acting as a torque multiplier between the input and output shafts during a stationary condition of one of the aforementioned driven members and the rotation of the other of the aforementioned driven members and as a differential coupling of the said one and said other driven members to the output shaft during rotation of both of these driven members causing them to share the load of the output shaft, said means including a member drivingly connected with the output shaft and journalled on the input shaft, and a one-way brake preventing rotation in one direction so as to bring about the above stationary condition of said one driven member, said brake surrounding the output shaft.

8. An assembly comprising an input shaft, an output shaft, a fluid power-transmitting device comprisnig a driving member drivingly connected with the input shaft and a plurality of driven members, the said members conjointly defining a liquid working chamber and said members each having fixed radial vanes extending the depth of the chamber, one driven member having the driving member at one side and receiving fluid therefrom, another driven member being at the other side of the said one driven member and spaced from the driving member so as to receive fluid from the driving member only after passage of the fluid through the said one driven member and to return fluid to the driving member only by way of the said one driven member, means interconnecting the output shaft and the said one and said other driven members in an epicyclic train acting as a torque multiplier between the input and output shafts during a stationary condition of the said other driven member and a rotation of the said one driven member and as a differential coupling of the said one and said other driven members to the output shaft during rotation of both of these driven members causing them to share the load of the output shaft, said means including a member drivingly connected with the output shaft and journalled on the input shaft, and a one-way brake preventing rotation of the said other driven member in one direction so as to bring about the above stationary condition of the said other driven member.

9. An assembly comprising an input shaft, an output shaft, a fluid power-transmitting device comprising a driving member drivingly connected with the input shaft and a plurality of driven members, the said members conjointly defining a liquid working chamber and said members each having fixed radial vanes extending the depth of the chamber, one driven member surrounding the input shaft and having the driving member at one side and receiving fluid therefrom, another driven member surrounding the input shaft and being at the other side of the said one driven member and spaced from the driving member so as to receive fluid from the driving member only after passage of the fluid through the said one driven member and to return the fluid to the driving member only by way of the said one driving member, a sun gear, a ring gear, a planet gear meshing with the sun gear and the ring gear, a carrier for the planet gear, means drivingly connecting the said one driven member with one element of the group composed of the ring gear, the sun gear, and the planet carrier, means drivingly connecting the said other driven member with another element of the aforesaid group, and means drivingly connecting the output shaft with the third element of the aforesaid group.

10. An assembly comprising an input shaft, an output shaft coaxial with said input shaft, adjacent ends on said shaft in juxtaposition to each other, fluid power-transmitting device comprising a driving member, means including a sleeve drivingly connecting the input shaft with the driving member and a plurality of driven members, the said members conjointly defining a liquid working chamber and said members each having fixed radial vanes extending the depth of the chamber, one driven member being journalled on said sleeve and having the driving member at one side and receiving fluid therefrom, another driven member being at the other side of the said one driven member and spaced from the driving member so as to receive fluid from the driving member only after passage of the fluid through the said one driven member and to return fluid to the driving member only by way of the said one driven member, a sun gear carried by said sleeve, a ring gear, a planet gear meshing with the sun gear and the ring gear, a carrier for the planet gear, means drivingly connecting the said one driven member with the sun gear, means drivingly connecting the said other driven member with the ring gear, and means drivingly connecting the output shaft with the carrier for the planet gear.

11. In combination, an input shaft, a multi-stage fluid coupling comprising a driving member drivingly connected to the input shaft, a first driven member, a second driven member, and a casing fixed to the second driven member and enclosing the driving and driven members, the said members conjointly defining a liquid working chamber and said members each having fixed radial vanes extending the depth of the chamber, a sun gear fixed to the first driven member, a ring gear fixed to the second driven member and the casing, planet gears meshing with the ring and sun gears, a carrier for the planet gears, all the gears and the planet carrier being positioned within the casing, an output shaft axially shiftable into the casing into driving engagement with the planet carrier, a tubular extension of the casing surrounding the output shaft and axially shiftable therewith out of driving engagement with the casing, a fixed means, and a one-way brake operative between the tubular extension and the fixed means so as to act through the tubular extension and the casing to prevent rotation of the ring gear in one direction.

12. In combination, a multi-stage fluid coupling comprising a driving member, first and second driven members, and a casing enclosing the driving and driven members and fixed to the second driven member, a sun gear fixed to the first driven member, a ring gear fixed to the second driven member and the casing, planet gears meshing with the sun and ring gears, a carrier for the planet gears, the gears and the carrier being within the casing, an input shaft projecting into the casing, a sleeve splined to the input shaft, a magnetic clutch adapted to connect the sleeve and the driving member of the fluid coupling, means journaling the first driven member on the sleeve, means journaling the planet carrier on the sleeve, means journaling the planet carrier in the casing, an output shaft having an end positioned within the casing adjacent an end of the input shaft in driving engagement with the planet carrier and being axially retractible from the casing and from driving engagement with the planet carrier, a tubular extension of the casing journaled on the output shaft and having driving engagement with the casing, a fixed support having a detachable portion, a one-way brake operative between the detachable portion of the fixed support and the tubular extension so as to act through the tubular extension and the casing to prevent rotation of the ring gear in one direction, the detachable portion of the fixed support and the tubular extension constituting with the output shaft a retractible unit, whereby disengagement of the tubular extension from the casing and movement of the detachable portion of the fixed support with respect to the remainder thereof take place simultaneously with the aforesaid retraction of the output shaft from driving engagement with the planet carrier.

13. In combination, an input shaft, an output shaft located in end-to-end adjacency with respect to said input shaft, a fluid power-transmitting device comprising a driving member and a driven member, means drivingly connecting the driven member and the output shaft, a magnetic clutch for drivingly connecting the input shaft and the driving member, and means for supplying current to the magnetic clutch comprising a conducting ring fixedly mounted on the output shaft in surrounding relation thereto and being insulated from the output shaft, a first contact mounted at the end of the output shaft adjacent the input shaft for rotation with the output shaft and being insulated therefrom, a first insulated conductor electrically connecting the first contact and the ring and extending through the output shaft, and a second insulated conductor extending from the magnetic clutch through the input shaft to the end thereof adjacent the output shaft, a second contact mounted at the end of the input shaft in electrical connection with the second insulated conductor and a third contact coaxial with and intermediate said first and second contacts, said third contact having a releaseable interengageable electrical connection with one of said first and second contacts and a resilient electrical connection with the other of said first and second contacts.

14. In combination, an input shaft, an output shaft located in end-to-end adjacency with respect to the input shaft, a fluid coupling comprising a driving member, a first driven member, and a second driven member, a magnetic clutch including a first set of alternate plates splined to the driving member of the fluid coupling and a second set of alternate plates, a sleeve splined on the input shaft and splined to the second set of alternate plates of the magnetic clutch, a sun gear drivingly connected to the first driven member of the fluid coupling, a ring gear drivingly connected to the second driven member of the fluid coupling, planet gears meshing with the sun gear and the ring gear, a carrier for the planet gears splined to the output shaft, the output shaft being axially retractible out of adjacency to the input shaft and out of engagement with the planet carrier, a fixed housing having a portion surrounding the output shaft, and means for supplying current to the magnetic clutch for pressing the sets of plates against one another for frictional engagement therebetween for drivingly connecting the sleeve and the driving member of the fluid coupling, said means comprising a first spring-urged plunger mounted in the said portion of the housing so as to be insulated therefrom, a ring mounted on the output shaft so as to surround the same and to be insulated therefrom and to be engaged by the first plunger, a conducting socket mounted in the end of the output shaft adjacent the input shaft on the axis of the output shaft so as to be insulated from the output shaft, a first insulated conductor connecting the ring and the socket, a plug coaxial with the input and output shafts and engageable with the socket, means mounting the plug in the planet carrier so as to insulate it from the planet carrier and to make it rotatable therewith, axial retraction of the output shaft out of adjacency with the input shaft and engagement with the planet carrier causing disengagement of the socket from the plug, a second insulated conductor extending from the magnetic clutch through the sleeve and the input shaft to the end of the input shaft adjacent the output shaft, and a second spring-urged plunger connected with the second conductor in the input shaft on the axis thereof and slidably engaging the plug.

15. In combination, an input shaft, an output shaft located in end-to-end adjacency with respect to the input shaft, a fluid power-transmitting device comprising a driving member and a plurality of driven members, means drivingly connecting the driven members with the output shaft, the output shaft being axially retractible from adjacency with the input shaft and from engagement with the aforesaid connecting means, a magnetic clutch drivingly connecting the driving member of the fluid power-transmitting device with the input shaft, and means for supplying current to the magnetic clutch comprising a conducting ring fixedly mounted on the output shaft in surrounding relation thereto and being insulated therefrom, a conducting socket mounted in the end of the output shaft adjacent the input shaft and being insulated from the output shaft, a first insulated conductor electrically connecting the ring and the socket, a plug engageable with the socket, means mounting the plug in the said connecting means so as to insulate the plug from the connecting means and to make it rotatable therewith, a second insulated conductor extending from the magnetic clutch through the input shaft to the end thereof adjacent the output shaft, and a spring-urged element connected with the second conductor and mounted on the end of the input shaft so as to have sliding engagement with the plug, axial retraction of the output shaft from engagement with the said connecting means causing the socket in the output to be withdrawn from engagement with the plug connected with the second conducting ring mounted in the said connecting means.

16. In combination, an input shaft, an output shaft, a fluid power-transmitting device comprising a driving member and a driven member drivingly connected with the output shaft, a magnetic clutch adapted to provide a driving connection between the input shaft and the driving member, and means for supplying current to the magnetic clutch including a first insulated conductor extending through the output shaft, a second insulated conductor extending through the input shaft to the magnetic clutch, and a plurality of coaxial contacts on the axis of said shafts, one of said contacts being carried by the input shaft and the other two being rotatable with said output shaft, the last named contacts being adapted for releasable, slidable interengagement with each other and said one contact being arranged for spring biased electrical engagement with one of said interengageable contacts.

17. In combination, an input shaft, an output shaft aligned axially with the input shaft in end-to-end adjacency, a fluid power-transmitting device comprising a driving member and a plurality of driven members, the said members conjointly defining a liquid working chamber and said members each having fixed radial vanes extending the depth of the chamber, a magnetic clutch connecting the driving member and the input shaft, means for supplying current to the magnetic clutch comprising a conducting ring mounted on the periphery of the output shaft and insulated therefrom, a first insulated conductor connected with the ring and extending through the output shaft to the end thereof adjacent the input shaft, a second insulated conductor extending from the end of the input shaft adjacent the output shaft through the input shaft to the magnetic clutch, and means connecting the conductors and including relatively slidable elements associated with the adjacent ends of the input and output shafts, one driven member of the fluid power-transmitting device having the driving member thereof at one side, another driven member being at the other side of the said one driven member and spaced from the driving member so as to receive fluid from the driving member only after passage of the fluid through the said one driven member and to return fluid to the driving member only by way of the said one driven member, means interconnecting the output shaft and the said one and said other driven members in an epicyclic train acting as a torque multiplier between the input and output shafts during a stationary condition of the said other driven member and a rotation of the said one driven member and as a differential coupling of the said one and said other driven members to the output shaft during rotation of both of these driven members causing them to share the load of the output shaft, and a one-way brake preventing rotation of the said other driven member in one direction so as to bring about the above stationary condition of the said other driven member.

18. In combination, an input shaft, an output shaft, a fluid power-transmitting device comprising a driving member having means including a sleeve drivingly connecting it to the input shaft, first and second driven members, the said members conjointly defining a liquid working chamber and said members each having fixed radial vanes extending the depth of the chamber, first and second gears having fixed axes of rotation, a third gear meshing with the first and second gears, a carrier for the third gear providing the same with a revolving axis of rotation, all the gears being contained within the length of the fluid power-transmitting device, means drivingly connecting the first driven member with one element of a group composed of the first and second gears and the carrier and journalling both on said sleeve, means drivingly connecting the second driven member with another element of the group, and means drivingly connecting the output shaft with the remaining element of the group and means journalling said last-named means on said input shaft.

19. In combination, an input shaft, an output shaft, a fluid power-transmitting device comprising a driving member drivingly connected to the input shaft and first and second driven members, the said members conjointly defining a liquid working chamber and said members each having fixed radial vanes extending the depth of the chamber, first and second gears having fixed axes of rotation, a third gear meshing with the first and second gears, a carrier for the third gear providing the same with a revolving axis of rotation, all the gears being contained within the length of the fluid power-transmitting device and being transversely aligned with the vanes of one of the driven members, means drivingly connecting the first driven member with the first gear, means drivingly connecting the second driven member with the second gear, and means drivingly connecting the output shaft with the carrier and being journalled on said input shaft.

20. In combination, an input shaft, an output shaft, a fluid power-transmitting device comprising a driving member drivingly connected with the input shaft and first and second driven members, the said members conjointly defining a liquid working chamber and said members each having fixed radial vanes extending the depth of the chamber, an external gear, an internal gear, a planet gear meshing with the external and internal gears, a carrier for the planet gear providing the same with a revolving axis of rotation, all the gears being contained within the length of the fluid power-transmitting device and being transversely aligned with the vanes of one of the driven members, means drivingly connecting the first driven member with one of the group composed of the internal and external gears and the carrier, means drivingly connecting the second driven member with another of the group, and means drivingly connecting the output shaft with the remaining one of the group said means being journalled on said input shaft.

21. In combination, an input shaft, an output shaft, a fluid power-transmitting device comprising a driving member drivingly connected with the input shaft and first and second driven members, the said members conjointly defining a liquid working chamber and said members each having fixed radial vanes extending the depth of the chamber, an external gear, an internal gear, a planet gear meshing with the external and internal gears, a carrier for the planet gear providing the same with a revolving axis of rotation, all the gears being contained within the length of the fluid power-transmitting device and being transversely aligned with the vanes of one of the driven members, means drivingly connecting one of the driven members with the internal gear, means drivingly connecting the other of the driven members with the external gear, and means drivingly connecting the output shaft with the carrier and being journalled on said input shaft.

22. In combination, an input shaft, an output shaft, a fluid power-transmitting device comprising a driving member drivingly connected with the input shaft, a first driven member adjacent the driving member, a second driven member adjacent the first driven member and spaced from the driving member, the said members conjointly defining a liquid working chamber and said members each having fixed radial vanes extending the depth of the chamber, an external gear, an internal gear, a planet gear meshing with the internal and external gears, a carrier for the planet gear providing the same with a revolving axis of rotation, all the gears being contained within the length of the fluid power-transmitting device and being transversely aligned with the vanes of one of the driven members, means drivingly connecting the external gear to the first driven member, means drivingly connecting the internal gear to the second driven member, and means drivingly connecting the carrier to the output shaft and being journalled on said input shaft.

23. In combination, an input shaft, an output shaft, a fluid power-transmitting device comprising a driving member drivingly connected with the input shaft, a first driven member adjacent the driving member, and a second driven member adjacent the first driven member and spaced from the driving member, the said members conjointly defining a liquid working chamber and said members each having fixed radial vanes extending the depth of the chamber, an external gear formed as a hub extension of the first driven member and positioned within the second driven member, an internal gear attached to and positioned within the second driven member so as to surround the external gear, a planet gear meshing with the external and internal gears, and a carrier for the planet gear drivingly connected to the output shaft and journalled on said input shaft.

24. In combination, an input shaft, an output shaft, a fluid power-transmitting device comprising a driving member, a first driven member adjacent the driving member, and a second driven member adjacent the first driven member and spaced from the driving member, the said members conjointly defining a liquid working chamber and said members each having fixed radial vanes extending the depth of the chamber, a sleeve splined to the input shaft, a magnetic clutch connecting the sleeve and the driving member, a hub for the first driven member journalled on the sleeve and having an extension formed as an external gear positioned within the second driven member, an internal gear attached to and positioned within the second driven member so as to surround the external gear, a planet gear meshing with the internal and external gears, and a carrier for the planet gear providing the same with a revolving axis of rotation and being journalled on the input shaft and splined to the output shaft.

25. In combination, an input shaft, an output shaft, a fluid power-transmitting device comprising a driving member drivingly connected with the input shaft, first and second driven members, the said members conjointly defining a liquid working chamber and said members each having fixed radial vanes extending the depth of the chamber, the driving member being at one side of the first driven member and the second driven member being at the other side of the first driven member, a casing secured to the second driven member and extending therefrom around the first driven member and the driving member into adjacency with the input shaft, a first seal for the fluid power-transmitting device acting between the casing and the input shaft, an external gear attached to the first driven member and positioned within the casing, an internal gear attached to the second driven member and positioned within the casing, a planet gear meshing with the internal and external gears and positioned within the casing, a carrier for the planet gear drivingly connected with the output shaft and journalled on the input shaft, and a second seal for the fluid power-transmitting device acting between the casing and the carrier.

26. In combination, an input shaft having a flange, an output shaft, a fluid power-transmitting device comprising a driving member, first and second driven members, and a casing secured to the second driven member, the said members conjointly defining a liquid working chamber and said members each having fixed radial vanes extending the depth of the chamber, the first driven member being between the second driven member and the driving member so as to space them from one another, a part splined to the input shaft, a magnetic clutch drivingly connecting the part and the driving member of the fluid power-transmitting device and being wider than the part, the casing enclosing the members of the fluid power-transmitting device and the magnetic clutch and having a channel portion positioned between the part and the flange on the input shaft so as to open toward the flange, a first seal for the device acting between the channel portion of the casing and the flange, an external gear secured to the first driven member of the fluid power-transmitting device and positioned within the casing, an internal gear secured to the second driven member of the device and positioned within the casing, a planet gear meshing with the external and internal gears, a carrier for the planet gear splined to the output shaft, and a second seal for the device acting between the casing and the planet carrier.

27. In combination, a driving shaft, a driven shaft, a fluid power transmitting device comprising a driving member, first, second, and third driven members arranged in order from the driving member, and a casing surrounding the members and secured to the third driven member, a magnetic clutch for drivingly connecting the driving shaft and the driving member, a first sun gear drivingly connected to the first driven member, a first internal gear drivingly connected to the second driven member, a first planet gear meshing with the first sun and internal gears, a first carrier for the first planet gear, a second sun gear drivingly connected with the first carrier, a second internal gear drivingly connected to the third driven member, a second planet gear meshing with the second sun gear and the second internal gear, a second carrier for the second planet gear drivingly connected to the driven shaft, a fixed means, a one-way brake acting between the fixed means and the second internal gear, and a one-way clutch acting between the first and second internal gears in the same direction as the one-way brake.

28. An assembly comprising an input shaft, an output shaft, a fluid power transmitting device comprising a driving member and first, second, and third driven members arranged in order from the driving member, a first external gear having a fixed axis of rotation and being drivingly connected to the first driven member, a first internal gear having a fixed axis of rotation and being drivingly connected to the second driven member, a first pinion meshing with the first internal and external gears, a first carrier providing the first pinion with a revolving axis of rotation, a second external gear having a fixed axis of rotation and being drivingly connected to the first carrier, a second internal gear having a fixed axis of rotation and being drivingly connected to the third driven member, a second pinion meshing with the second external and internal gears, a second carrier providing the second pinion with a revolving axis of rotation and being drivingly connected to the output shaft, a one-way brake acting to prevent rotation of the second driven member and the first internal gear in one direction, and means including a one-way clutch acting to prevent rotation of the third driven member and the second internal gear in the said one direction.

29. An assembly comprising an input shaft, an output shaft coaxial with said input shaft, said shafts having their adjacent ends in juxaposition to each other, a fluid power transmitting device comprising a driving member, means including a sleeve drivingly connecting the input shaft with the driving member, and a plurality of driven members, the said members conjointly defining a liquid working chamber, and said members each having fixed radial vanes extending the depth of the chamber, one driven member being journalled on said sleeve and having the driving member at one side and receiving fluid therefrom, another driven member being at the other side of the said one driven member and spaced from the driving member so as to receive fluid from the driving member only after passage of the fluid through the said one driven member and to return the fluid to the driving member only by way of the said one driven member, a sun gear carried by said sleeve, a ring gear, a planet gear meshing with the sun gear and the ring gear, a carrier for the planet gear, means drivingly connecting the said one driven member with one of the sun and ring gears, means drivingly connecting the said other driven member with the other of the sun and ring gears, and means drivingly connecting the output shaft with the carrier for the planet gear.

JOSEPH R. LEMON.

REFERENCES CITED

The following references are of record in the file of this patent:

UNITED STATES PATENTS

| Number | Name | Date |
| --- | --- | --- |
| 2,015,300 | Dell | Sept. 24, 1935 |
| 2,158,557 | Lammeren | May 16, 1939 |
| 2,203,177 | Patterson | June 4, 1940 |
| 2,277,214 | Dodge | Mar. 24, 1942 |
| 2,296,520 | Griswold | Sept. 22, 1942 |
| 2,312,849 | Pollard | Mar. 2, 1943 |
| 2,316,390 | Biermann | Apr. 13, 1943 |
| 2,318,660 | Barrett | May 11, 1943 |
| 2,324,693 | Griswold | July 20, 1943 |
| 2,354,139 | Paton | July 18, 1944 |
| 2,354,597 | Jandasek | July 25, 1944 |
| 2,358,821 | Murray | Sept. 26, 1944 |
| 2,397,368 | Pennington | Mar. 26, 1946 |
| 2,415,894 | Lemon | Feb. 18, 1947 |